INVENTOR.
Adelbert E. Kolbe
BY
J.D. McGraw
ATTORNEY

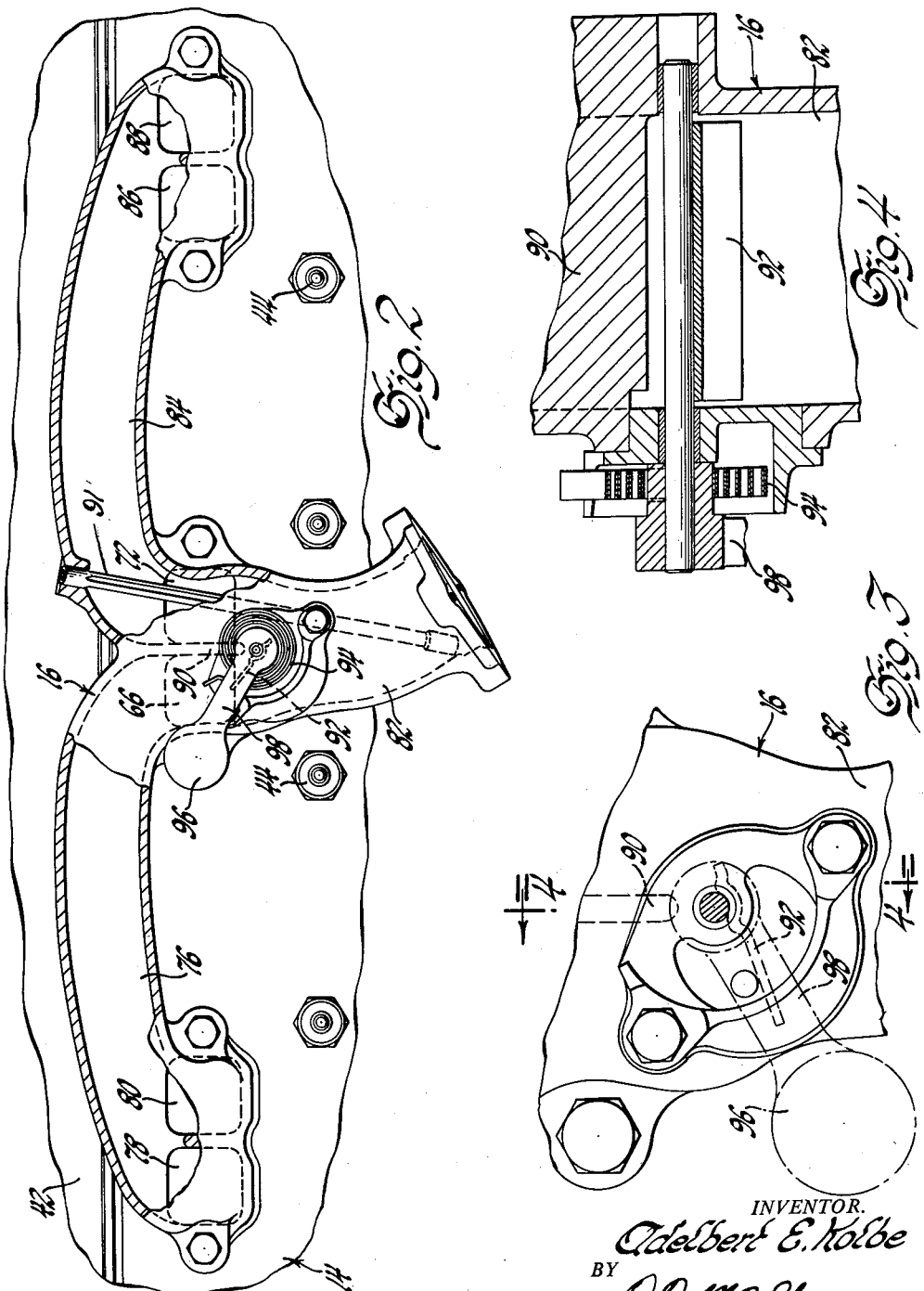

ved Feb. 6, 1962

3,019,781
ENGINE MANIFOLDING
Adelbert E. Kolbe, Berkley, Mich., assignor to General Motors Corporation, Detroit, Mich., a corporation of Delaware
Filed Dec. 29, 1958, Ser. No. 783,508
2 Claims. (Cl. 123—122)

The invention relates to the manifold system for an internal combustion engine and more particularly to the structural details of the intake and exhaust manifolds and their interrelation. The intake manifold is formed integrally with the cylinder head and the exhaust manifold is mounted on a portion of the head. This simplifies engine assembly and results in a stronger unit which may be produced at less expense.

The intake manifold portion of the head is so arranged that the engine carburetor is mounted to one side of the engine block and the inlet distribution passages are provided for maximum equality of distribution to each of the engine cylinders. The exhaust manifold is mounted on the opposite side of the head from the carburetor and is angled to provide the shortest possible passages for the exhaust gases to escape from the combustion chambers of the cylinders. The integral heating system is provided to heat the incoming fuel-air mixture when the engine is cold and the system is automatically adjusted to reduce the amount of heat as the engine warms up. This is accomplished by providing a heat passage which directs the exhaust gases from a portion of the cylinders entirely around the fuel-air distribution chamber and returns the exhaust gas to the exhaust manifold system.

In the drawing:

FIGURE 2 is a view of the exhaust manifold portion of the engine of FIGURE 1 taken in the direction of arrows 2—2 of that FIGURE.

FIGURE 3 is a fragmentary view of the heat control valve system and showing the valve in the position assumed when the engine is cold.

FIGURE 4 is a fragmentary cross section view of the heat control valve taken in the direction of arrows 4—4 of FIGURE 3.

Figure 1:
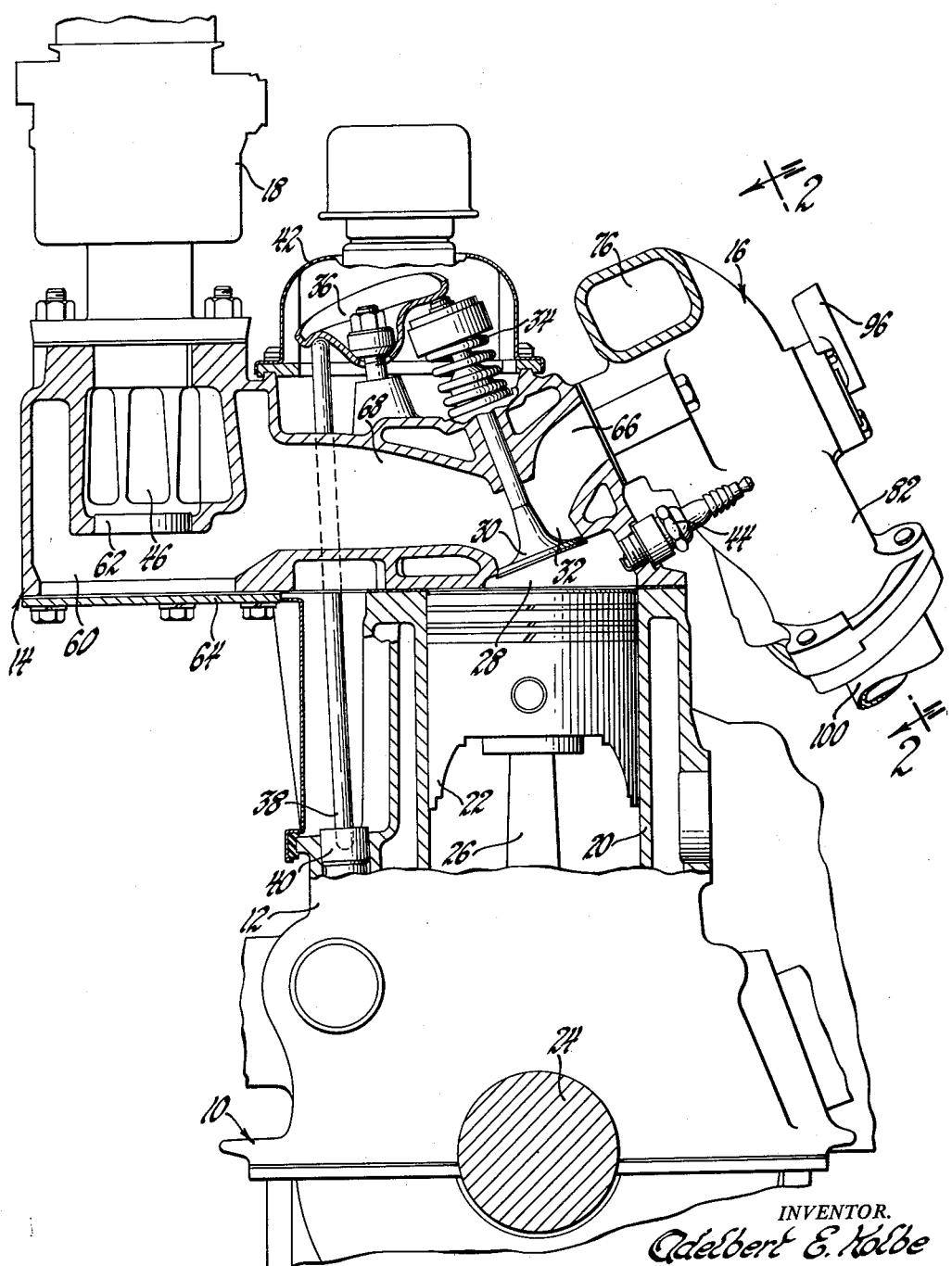
FIGURE 1 is an end view of an engine embodying the invention and having parts broken away and in section as seen in the direction of arrows 1—1 of FIGURE 5.

The engine 10 of FIGURE 1 includes a block 12, a combined head and intake manifold 14 and an exhaust manifold 16. A carburetor 18 is mounted on the intake manifold portion of the head 14 and provides a proper fuel-air mixture for the engine. The block is composed of a plurality of cylinders, the engine being illustrated in this instance as a six-cylinder in-line engine. The cylinder 20 illustrated in FIGURE 1 is the No. 3 cylinder. Piston 22 is received for reciprocation within cylinder 20 and is connected to the crankshaft 24 by the piston rod 26 in the usual manner. The combustion chamber 28 is illustrated as being formed within the head 14. Exhaust valve 30 for the No. 3 cylinder is positioned in the exhaust passage 32 and opens and closes in timed relation under influence of the valve spring 34 and the valve linkage including the rocker 36, push rod 38, and valve lifter 40. The valve linkage is actuated in the conventional manner from a camshaft. The valve gallery is provided with a cover 42 which is fastened to the upper side of the head 14 by any suitable means. A spark plug 44 extends into the combustion chamber 28 to provide spark ignition for the engine.

Figure 5:
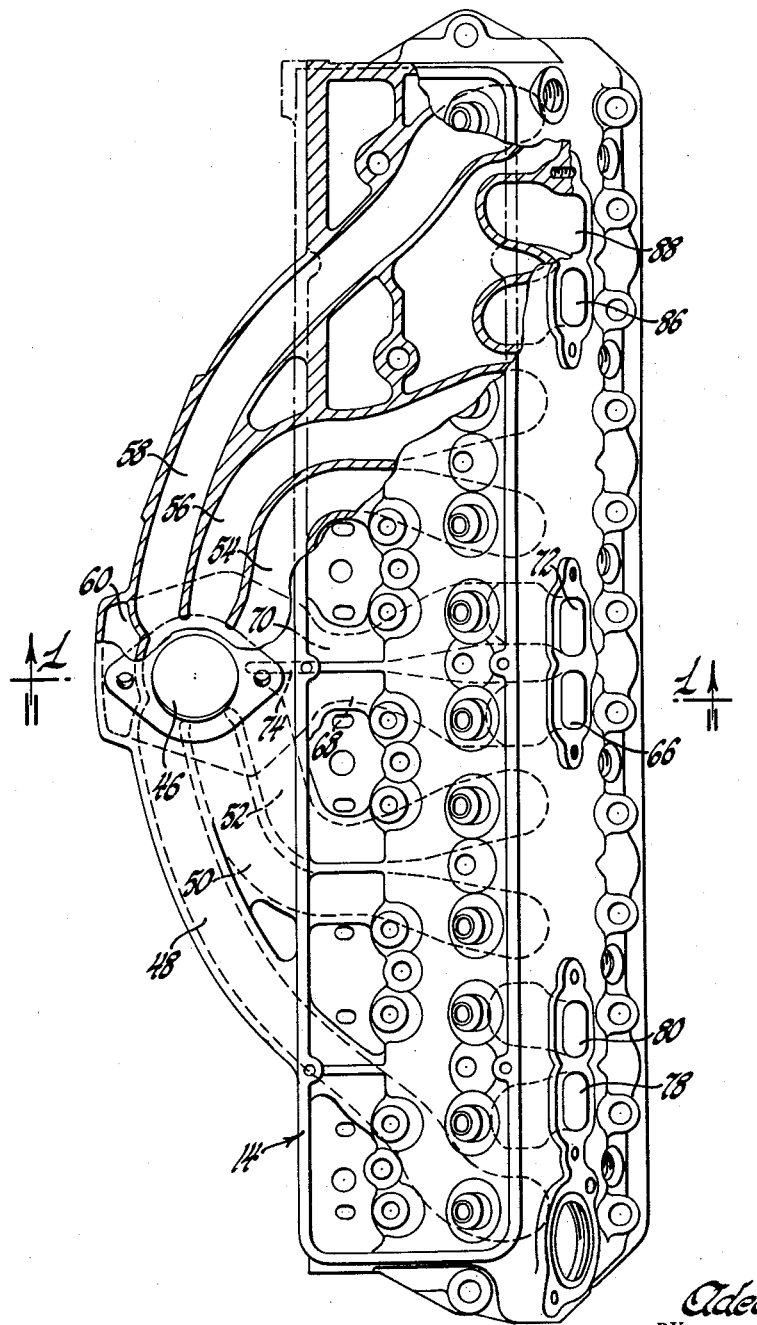
FIGURE 5 is a plan view of the combined intake manifold and engine head of the engine shown in FIGURE 1 and having parts broken away and in section.

The intake manifold portion of the head is best illustrated in FIGURE 5. The fuel-air mixture leaving carburetor 18 enters the distribution chamber 46 from which each of the inlet branch passages lead to a cylinder. The inlet branch passages 48, 50, and 52 lead from one side of the distribution chamber by individual apertures and are curved to provide a minimum obstruction to the passage of the fuel-air mixture to the combustion chambers. Inlet branch passages 54, 56, and 58 leave from the other side of the distribution chamber 46 in a similar manner. The distribution chamber extends downwardly within a heating chamber 60 formed integrally within the head and manifold 14. A plug 62 fills the lower end of the distribution chamber 46 and separates it from the heating chamber 60. A cover plate 64 in turn seals the heating chamber 60 from the atmosphere. The exhaust passage 32 leading from the No. 3 exhaust valve 30 is divided into two parts. The portion 66 leads to the exhaust manifold 16 and the portion 68 leads across the head and connects with the heating chamber 60. Under one condition of operation the exhaust gas leaving the No. 3 combustion chamber 28 passes through the portion 68 and into the chamber 60, thereby heating the distribution chamber 46 and the fuel-air mixture therein. A second exhaust passage portion 70 connects the heating chamber 60 with the No. 4 cylinder exhaust passage 72 and is generally similar to passage 68, being separated therefrom by a fin 74. The exhaust gases in heating chamber 60 can pass through the portion 70 and flow by the No. 4 exhaust valve and into the exhaust manifold 16 through passage 72. This condition is achieved while the engine is cold and results in more satisfactory engine operation under this condition.

The exhaust manifold 16 is provided with a manifold branch 76 which connects the exhaust passages 78 and 80 from Nos. 1 and 2 cylinders, respectively, to the exhaust outlet passage 82 in the manifold. A similar manifold branch 84 connects the exhaust passages 86 and 88 leading from Nos. 5 and 6 cylinders, respectively, to the exhaust outlet passage 82. A fin-type separator 90 aids in directing the exhaust gases into the outlet passage 82. At the ends of branches 76 and 84, exhaust passages 66 and 72 from the Nos. 3 and 4 cylinders connect with the exhaust manifold so that the gases passing outwardly therefrom may also be received in the outlet passage 82. The stove 91 may be provided in the manifold 16 to deliver heat to an automatic choke on the carburetor 18.

A heat control valve 92 is positioned within the exhaust outlet 82 immediately adjacent the end of the separator 90 and is pivotable to block the exhaust gases from the Nos. 1, 2, and 3 cylinders from entering the exhaust outlet passage 82 directly. This valve will then force the exhaust gases from these three cylinders to pass through passage 68 and into heating chamber 60 to heat the incoming fuel-air mixture. The gas is then passed through passage 70 and into the exhaust manifold through the No. 4 exhaust passage 72. The heat control valve is provided with a heat sensitive element 94 and a valve actuating weight 96 mounted on the weight arm 98. When the exhaust gases have sufficiently heated element 94, valve 92 is moved clockwise as seen in FIGURE 2 and opens the exhaust manifold branch 76 directly to the exhaust outlet 82. The exhaust gases from the three cylinders connected with branch 76 are then permitted to pass directly into the exhaust passage 82 which in turn is connected with the exhaust pipe 100. When the valve 92 is in the fully open position, there is no substantial flow of exhaust gases through the heating chamber 60 and the engine operates in the normal manner without preheating the fuel-air mixture. The engine intake manifolding is sufficiently warm at that time to provide all of the necessary heat for proper engine operation.

An engine manifolding system has been disclosed which may be inexpensively manufactured and will provide excellent fuel-air mixture heating characteristics when required. The system will exhaust the manifold gases directly from the combustion chambers into the intake manifold and will therefore transmit a minimum amount of heat to the engine block and heat after the engine reaches its operating temperature.

I claim:

1. In an internal combustion engine cylinder head and intake and exhaust manifold unit, a first section defining a cylinder head and forming a portion of the engine combustion chambers, a second section integrally formed with said first section and forming an intake manifold having passages including an inlet distribution chamber and individual inlet tubes for each of the engine combustion chambers and connected with said distribution chamber to receive fuel-air mixture therefrom, a third section integrally formed with said first and second sections and including individual exhaust passages leading from each of the combustion chambers and a generally U-shaped exhaust passage leading from one of said individual exhaust passages and around said distribution chamber and to another of said individual exhaust passages, and a fourth section attached to said third section and comprising an exhaust manifold for receiving exhaust gases from said third section and a heat sensitive control valve mounted in said exhaust manifold adjacent said one individual exhaust passage and positionable in the closed position to direct exhaust gases through said U-shaped exhaust passage to said another individual exhaust passage and in the open position to permit flow of exhaust gases directly through said exhaust manifold from said one individual exhaust passage, said exhaust manifold having a plurality of branches and a central outlet connected therewith, each of said branches being adapted to receive exhaust gases from a plurality of said third section individual exhaust passages and said heat control valve being so positioned in said exhaust manifold when closed as to direct the flow of exhaust gases in one of said branches through said U-shaped passage in one direction only and out through at least a portion of another of said branches and into said central outlet and when said valve is open to permit induced flow of exhaust gases from said branches directly into said central outlet without passing through said U-shaped passage.

2. An exhaust system for an internal combustion engine comprising, a cylinder head having individual cylinder exhaust passages and an intake manifold heating exhaust passage having the two ends thereof connecting with two of said individual cylinder exhaust passages, an exhaust manifold for receiving exhaust gases from said individual cylinder exhaust passages and having a plurality of branches and a central outlet connected therewith and each of said branches receiving exhaust gases from a plurality of said individual cylinder exhaust passages, a heat sensitive control valve mounted in said exhaust manifold adjacent one of said two individual cylinder exhaust passages and positionable in the closed position to direct the flow of exhaust gases in one of said branches through said intake manifold heating exhaust passage to the other of said two individual cylinder exhaust passages in one direction only and out through at least a portion of another of said branches and into said central outlet and in the open position to permit flow of exhaust gases directly through said exhaust manifold from the one of said two individual cylinder exhaust passages and to permit induced flow of exhaust gases from said branches directly into said central outlet without passing through said intake manifold heating passage.

References Cited in the file of this patent

UNITED STATES PATENTS

| | | |
|---|---|---|
| 1,464,466 | Church | Aug. 7, 1923 |
| 1,507,315 | Hunt | Sept. 2, 1924 |
| 1,998,636 | Porter | Apr. 23, 1935 |
| 2,175,438 | Manning | Oct. 10, 1939 |
| 2,503,071 | Scherger | Apr. 4, 1950 |
| 2,603,199 | Moseley | July 15, 1952 |
| 2,730,339 | Presnell | Jan. 10, 1956 |
| 2,871,841 | Goodridge et al. | Feb. 3, 1959 |

FOREIGN PATENTS

| | | |
|---|---|---|
| 685,860 | France | Apr. 7, 1930 |